H. WORKMAN.
CINEMATOGRAPH APPARATUS.
APPLICATION FILED MAY 8, 1916.
1,248,587.
Patented Dec. 4, 1917.
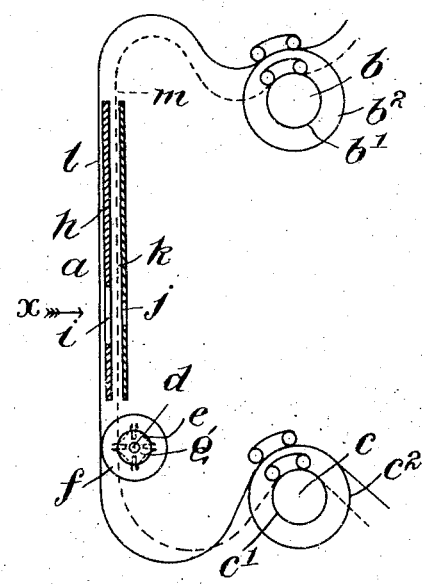
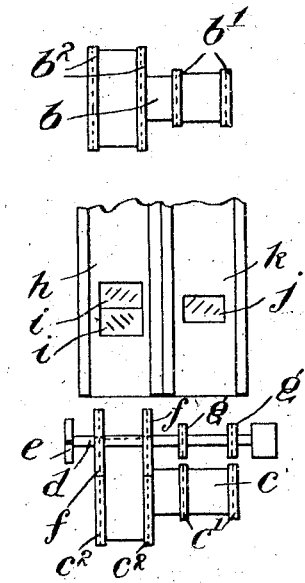
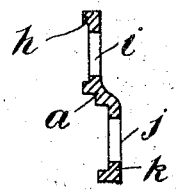
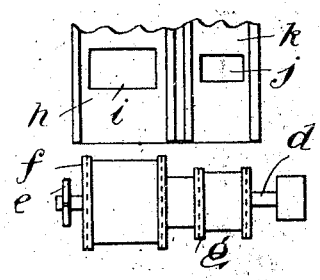
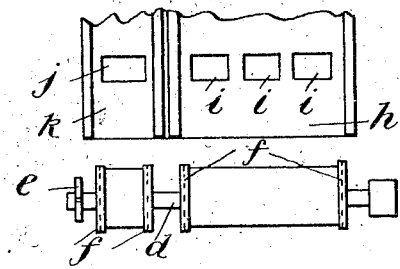
Witnesses.
Albert Y Barnes
Henry Richard Brunsdon
Inventor
Harold Workman
by H C Heide
Attorney

UNITED STATES PATENT OFFICE.

HAROLD WORKMAN, OF GLASGOW, SCOTLAND.

CINEMATOGRAPH APPARATUS.

1,248,587.

Specification of Letters Patent. Patented Dec. 4, 1917.

Application filed May 8, 1916. Serial No. 96,192.

*To all whom it may concern:*

Be it known that I, HAROLD WORKMAN, a subject of His Majesty King George V of the United Kingdom of Great Britain and Ireland and of the British Dominions Beyond the Sea and Emperor of India, residing at Glasgow, Scotland, have invented certain new and useful Improvements in or Relating to Cinematograph Apparatus, of which the following is a specification.

This invention relates to cinematograph projecting machines, and has for its object the provision of new or improved means and appliances whereby such apparatus provided with one set of driving mechanism may be easily altered and adapted to show two or more different types of cinematograph film, *i. e.*, films of different width and for different lengths of pull or picture spacing.

The invention more particularly applies to an ordinary standard cinematograph film as now universally adopted, and a color film in which the pictures forming a group of two or three color records are projected simultaneously in superimposition on the screen through two or three lenses and suitable color filters, which may be fixed or moving or embodied in the film, hereinafter referred for convenience as separate record color films. The invention includes such adaptation generally, whether the pictures forming the group of color records on the latter film are placed one above another on a standard or single width film either consecutively or spaced out, or are placed side by side at the same or different levels on the film.

The invention also includes adaptations by which either a standard film or a film of special width having a single picture rank in which the pictures are of any size or type may be shown by one and the same projector, for example the second mentioned film may contain pictures of larger or smaller size than the present usual standard, but such pictures should preferably have the same proportions as the pictures on the standard film to avoid altering the masking or the projecting screen.

To the foregoing ends the present invention comprises a cinematograph projector comprising an extended gate and film track system for different types of film such as herein described, in which each of two or more different types of film has its own individual gate aperture or apertures, film track and feed and take up devices and in which the intermittent mechanism is extended and this and the feed and take up devices are actuated by a common driving mechanism.

The invention also comprises a cinematograph projector having a standard or single gate aperture and film track, and alongside of it another one or more gate apertures and a film track, or tracks, suited to a special film or films such as herein set forth, with extended intermittent mechanism and extended feed and take up mechanism for appropriate pull down, feed, and take up of the respective film bands and common driving mechanism for actuating such mechanism.

The present more particular application of the invention comprises a cinematograph projector with one set of driving mechanism, provided with a standard or single gate aperture and alongside of it one or more sets of gate apertures the said set or each such set being arranged to show simultaneously a set of two or more color records taken simultaneously in groups upon a film or films of any desired width and length of picture pull, the sprocket wheels, both feed and take up, being extended and being stepped or not as may be necessary to take the desired films for the standard or single gate aperture and for each set or sets of gate apertures, and the intermittent driving mechanism being also extended across the different film paths and adapted to pull the film forward to the desired extent in each film path.

The pull necessary for the group of color records simultaneously projected need not necessarily be that for standard film (about $\frac{3}{4}''$), and according to the invention I provide for example a projector with a gate aperture and guides for standard or single width film, and alongside of it two or three gate apertures arranged as required for the desired separate record color film, the driving sprocket wheels, both feed and take up, being extended or having suitably located toothed rims to carry both types of films, the toothed rims for the color film being of the same or greater or less diameter as may be required by the spacing of or length of pull for the group of records on the separate record color film, and the intermittent mechanism whether of the Maltese cross or dog or other type of movement being also extended over all the gate apertures or applied to actuate the respective types of film and adapted to give the desired length or lengths of pull for both types of film. In the event of the pull for the separate color record film group of records varying from the usual standard, the gate is preferably stepped slightly to bring it into line with the varied intermittent driving movement.

In carrying out this invention for example in a projector for showing standard width film and a two color separate record color film in which the pictures are projected simultaneously in pairs one above the other on a standard width film necessitating a double picture pull in the projector, the following procedure may be adopted.

The separate record color film gate is preferably arranged next to the mechanism side of the projector and the feed and take up sprocket wheels are extended and stepped with two diameters and two rows of teeth in each, the larger diameter step being twice the smaller one to feed and take up the separate record color film at double the ordinary rate. The spindle actuated by the Maltese cross movement, if such a movement is used, is also extended and has also two pairs of rims and rows of teeth, one pair of which are double the diameter of the other so that the separate record color film receives double the pull of the standard one.

The two gate apertures for the separate record color film are arranged one above the other, and alongside of them at any suitable level is arranged the gate aperture for the standard film but the film track and gate for the standard film is stepped forward for a distance equal to the difference in radius of the intermittent sprocket wheels, so that the line of the film in the film track in both cases is tangential or approximately so, to the rim of the intermittent sprocket wheel.

Two lenses are used in projecting the separate record color pictures and a separate lens is preferably used for projecting the standard film.

In changing over from the two color separate record color film to standard or ordinary film the lighting system must be altered to illuminate the single gate and the other gate apertures closed.

The lighting system for the color film may conveniently be of the type described in United States application No. 96,193 dated May 3, 1916, the prisms at the condenser and gate being moved out of the light path and the lantern body being moved sidewise into alinement with the single gate aperture when projecting standard film.

The invention can obviously also be applied to adapting a projector to show standard or ordinary width film through one gate aperture and a broad film with two or more color records upon it side by side at one level or different levels and with the standard (or single picture) length of pull or any other length of pull.

It is obvious also that by extending the principle of the invention three or more different types of film can be shown in one machine.

As illustrating the invention I have appended drawings in which is diagrammatically figured examples of conveniently and advantageously carrying the invention into effect for suiting one and the same projector to show either an ordinary standard film or a two color additive color record film, this in the first example depicted being of the kind in which the heliochromic pairs of separate images are ranged in sequence along the course of a single width film, necessitating a picture pull double that of the standard pull; in the second example depicted the adaptation is shown as for a standard film and a film having a single picture rank in which the pictures are of a larger size in proportion to the pictures of the standard film; in the third example the adaptation is shown for a standard film and an additive three color record film in which the three separate images of the heliochromic groups are set side by side on a wide support.

In the drawings:—

Figure 1 is a side view of the two gates and film tracks, feed and take up sprockets and intermittent sprockets of the example hereinabove first referred to.

Fig. 2 an end view looking in the direction of the arrow $x$ in Fig. 1. while,

Fig. 3 is a partial plan of Fig. 1.

Figs. 4 and 5 are partial end views similar to Fig. 2 of the second and third examples hereinabove referred to.

Referring to Figs. 1 to 3, $a$ denotes the additive color record film gate which having the longer picture pull is preferably arranged next to the mechanism side of the projector and is provided with two gate apertures in tandem. $b$ and $c$ are feed and take up sprocket wheels, these as shown being extended axially and shouldered down radially to provide portions $b^1$ $b^2$; $c^1$ $c^2$ of different diameter in the ratio of one to two each bearing two rows of teeth.

The spindle $d$ actuated by the Maltese cross movement, $e$ being the cross, is also correspondingly extended and is provided with two pairs of sprocket rims $f$ $f$ and $g$ $g$ respectively, the former being double the diameter of the latter so that the additive color record film receives double the pull of the standard one.

$h$ denotes the film track for the additive color record film for which the two gate apertures $i$, $i$ are arranged one above the other, and alongside of them at preferably the same level is arranged the gate aperture $j$ for the standard film but the film track $k$ and gate aperture $j$ for the standard film are preferably stepped forward as shown for a distance equal to the difference in radius of the intermittent sprocket wheels $f$ $f$ and $g$ $g$, so that the line of the film in the film track in both cases is tangential or approximately so, to the rims of the corresponding intermittent sprocket wheel.

From the foregoing Figs. 4 and 5 will be self explanatory.

In the event of a dog movement being employed, the position of the film in the gate at the end of each pull is regulated to a large extent by the teeth of the take up sprocket wheel, and the shaft carrying the dog roller is extended over both gates and if necessary a stepped roller or two rollers of suitable diameter to give the desired result may be employed.

Two lenses are used in projecting the additive color record film, a separate lens being preferably used for projecting the standard film. Stationary, running, or revolving color filters may be used for the color projection or the color filters may be embodied in the positive film, and one revolving shutter may cover all gate apertures.

The lantern house containing the single light source and the condenser will be shifted laterally, and the projector adapted by the introduction of the light distributing and directing device, to adjust and divide the light source for use through the two gates and their respective lenses, the gate apertures $j$ being closed up.

To change over from the additive color record film denoted in full lines by $l$ to standard or ordinary standard film, denoted in dotted lines $m$, the light distributing and directing device will be withdrawn and the lantern-house will be moved across to effectively illuminate the gate aperture $j$, the gate apertures $i$ being closed up.

The feed and take up mechanism and the intermittent mechanism are actuated by common driving mechanism in any well known manner; such not being shown as various arangements for this purpose are sufficiently well understood by those concerned.

From the foregoing it will be readily obvious that by elongating the sprocket portions $b^1$ and $c^1$ axially, by apportioning their diameter to such picture pull whether standard or otherwise as may be required, and by adding one or more rows of sprocket teeth where necessary to such elongated portions and by arranging the gate apertures side by side and widening the film tracks, the application of the invention to additive color record films of the kind in which the separate images of the heliochromic groups are set side by side on a wide film is easily effected, the gate apertures and the film tracks being stepped or not in relation the one to the other or others according as the nature of the picture pull may influence that condition.

It is obvious also that by extending the principles of the invention three or more different types of film can be shown in one machine.

What I claim is:

1. A cinematograph projector having a standard or single gate aperture and film track, and alongside of it a film track and second gate aperture arrangement suited for special film such as herein set forth, extended intermittent mechanism, extended feed and take up mechanism for appropriate pull down, feed and take up of the respective film bands and common driving mechanism for actuating such mechanism.

2. A cinematograph projector having a standard or single gate aperture and film track and alongside of it a film track and a plurality of gate apertures arranged one above the other, suited for special film such as herein set forth, extended intermittent mechanism, extended feed and take up mechanism for proportionate pull down, feed and take up of the respective film bands and common driving mechanism for actuating such mechanism.

3. A cinematograph projector for different types of film bands such as herein described comprising a plurality of gate aperture arrangements and film tracks, in combination with extended intermittent mechanism, extended feed and take up devices, and a common driving mechanism for actuating said devices.

4. A cinematograph projector for different types of film bands such as herein described having a standard gate and a special gate arranged in different parallel planes or in stepped relation the one to the other in the line of the light path.

5. A cinematograph projector having a standard or single gate aperture and film track, and alongside of it a film track and second gate aperture suited for film having a single picture series of other than standard size, extended intermittent mechanism, extended feed and take up mechanism for appropriate pull down, feed and take up of the respective film bands and common driving mechanism for actuating such mechanism.

In testimony whereof, I affix my signature.

HAROLD WORKMAN.